United States Patent Office 2,832,747
Patented Apr. 29, 1958

2,832,747

POLYMERIC COMPOSITIONS COMPRISING LINEAR POLYMERS UNITED THROUGH IONIC CROSSLINKAGES AND THROUGH COVALENT CROSSLINKAGES, PROCESS FOR THEIR PREPARATION, AND FABRICS COATED THEREWITH

Harold L. Jackson, Wilmington, Del., assignor to E. I. du Pont de Nemours and Company, Wilmington, Del., a corporation of Delaware No Drawing. Application February 18, 1953
Serial No. 337,672

19 Claims. (Cl. 260—45.5)

This invention relates to new polymeric compositions and to their preparation. More particularly, this invention relates to a new class of crosslinked polymers and to methods for their preparation.

The terms "crosslinked polymers" and "crosslinking" are used in their usual and accepted meaning in polymer chemistry (see, for example, Ellis, "The Chemistry of Synthetic Resins," Reinhold Publishing Corp. 1935, at pages 59–62; Gilman "Organic Chemistry," John Wiley and Sons, 1943, vol. I, chapter on Synthetic Polymers by Marvel and Horning, particularly at pages 703, 719, 720, and 750; Schildknecht, "Vinyl and Related Polymers," John Wiley and Sons, 1952, particularly at pages 68–81 and 208–211). Likewise, the terms "Covalent linkage" and "ionic linkage" have their usual meaning (see, for instance, in Gilman's "Organic Chemistry" already referred to, vol. II, the chapter on Modern Electronic Concepts of Valence by J. R. Johnson, particularly at pages 1825–1827).

Polymers crosslinked through covalent linkages, e. g., carbon to carbon, carbon to oxygen or carbon to sulfur covalent bonds, are of great technical importance because of their high resistance to organic solvents and to chemical reagents in general. Such covalently crosslinked polymers exist, for example, in vulcanized rubber. Another example is the ion-exchange resins, which are covalently crosslinked polymers containing ionic groupings, the latter, however, being of a single ionic type and not involved in the crosslinking system. Crosslinked polymers of this type, in spite of their usefulness in some fields, are unsuitable for many applications because of their hydrophobic nature and lack of moisture permeability.

Polymers cross linked through ionic linkages have also been described in the literature (Fuoss and Sadek, Sci. 110, 552 (1949). Such polymers have been obtained by reacting polyanions, e. g., polyacrylic acid (as the sodium salt), with polycations such as polymeric quaternary ammonium salts. Ion-crosslinked polymers are insoluble in water throughout the entire pH range, as well as in organic solvents, but they are soluble in aqueous solutions of certain salts such as sodium chloride, ammonium chloride or sodium chromate. Crosslinked polymers of this type have the disadvantage of low wet strength and poor dimensional stability.

It is an object of this invention to provide a new class of crosslinked polymers and a method for their preparation. A further object is to provide polymers characterized by a double crosslinked structure and methods for preparing such doubly crosslinked polymers. A still further object is to provide crosslinked polymers which possess a high degree of moisture permeability, high wet strength and good dimensional stability. Another object is to provide crosslinked polymers which are not only insoluble in water and in many aqueous salt solutions, such as in aqueous sodium chloride, but have a high degree of moisture permeability and thus are particularly useful in the form of films and coatings. Other objects will appear hereinafter.

These objects are accomplished by the following invention of polymeric materials comprising at least two oppositely charged ionic polyelectrolyte polymers united through a plurality of ionic crosslinkages and further having a plurality of covalent crosslinkages uniting said polyelectrolyte polymers. Thus the new products of this invention are polymeric materials composed of at least two polymeric species crosslinked through a plurality of both ionic and covalent bonds. The new polymers of this invention which are crosslinked through both types of linkages, i. e., through both covalent and ionic linkages possess a high degree of moisture permeability, high wet strength and good dimensional stability.

The novel polymers of this invention are prepared by reacting at least one polycationic polyelectrolyte polymer with at least one polyanionic polyelectrolyte polymer thereby causing the polyelectrolyte polymers to form an ionically crosslinked polymer and then covalently crosslinking said polyelectrolyte polymers. Thus these novel polymers can be prepared by reacting substantially equivalent quantities of a polycationic polyelectrolyte polymer and a polyanionic polyelectrolyte polymer, and further uniting the resultant ionically crosslinked polyelectrolyte chains through covalent crosslinks.

The space-network of these doubly crosslinked polymers thus consists of polymer chains of oppositely charged polyelectrolytes, which are bound together by ionic crosslinkages formed through the interaction of the cationic groups of one polyelectrolyte species with the anionic groups of the other polyelectrolyte species, and which are further bound together through atom chains attached to the polyelectrolyte polymer chains through covalent bonds. Such a structure may be depicted by the following formula, in which the linear polymer chains are represented by the horizontal lines, the ionic groups are, for purposes of illustration, carboxyl and quaternary ammonium groups, and X represents a divalent radical uniting two linear polymer chains through covalent bonds:

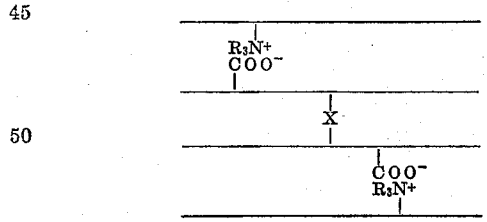

It will be apparent that these products differ structurally from the known polymers obtained by copolymerization of vinyl monomers containing anionic and cationic groups, respectively, e. g., the copolymers of methacrylic acid and vinylpyridine. Such copolymers have no covalent crosslinkages between polymer chains, and their ionic linkages are within the same polymer chain rather than across two chains. These structural differences are reflected in the fact that these copolymers are soluble in both dilute acid and dilute alkali, whereas the products of this invention are water-insoluble, even prior to the covalent crosslinking, over the entire pH range, i. e., insoluble in either dilute acid or dilute alkali.

The polyelectrolyte polymers employed in the preparation of these compositions are linear polymers which contain as integral components of the polymers themselves a plurality of ionically charged units attached to the linear polymer chain. Many such polymers, both of the cationic and anionic type, have been described in the literature. The polyelectrolytes should be soluble in some appropriate liquid reaction medium, which can be an organic solvent but is preferably water. Each polyelectrolyte polymer molecule should contain at least seven ionically charged units, since in general at least this number is required to obtain a final polymer of satisfactory properties.

In general, the ionic crosslinkages are formed by reacting the polycationic polyelectrolyte and the polyanionic polyelectrolyte in substantially chemically equivalent quantities, i. e., in such quantities that there is present about one anionic group for each cationic group. However, some departure from these quantities can be tolerated, for example, there can be used a moderate molar excess, up to 50%, of one or the other polyelectrolyte. The two polyelectrolytes are dissolved in a liquid reaction medium which can be an organic solvent, but is most conveniently water. The reaction takes place readily at ambient temperature, but if desired elevated temperatures up to about 100° C. can be used, the preferred temperature range being between 10 and 50° C. The reaction product, which is an ionically crosslinked polymer, is insoluble in water and in most organic solvents and separates from the reaction medium.

When, as is often the case, the polyanionic polyelectrolyte polymer is a salt of a polybasic polymeric acid and the polycationic polyelectrolyte polymer is a salt of a polymeric base, there is also formed by methathesis a simple organic or inorganic salt which is normally soluble in water and can be readily separated from the ionically crosslinked polymer. The ion-crosslinking reaction can be illustrated as follows, using as example a salt of a polymeric polycarboxylic acid, the symbol M representing the cation of this salt, and a polymeric polyquaternary ammonium halide, the symbol Hal representing the halogen, and the horizontal lines representing the linear polymeric chains:

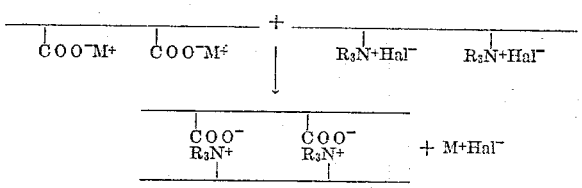

The covalent crosslinkages can then be introduced in the ionically crosslinked polymer in various ways. For example, one or both of the polymeric polyelectrolytes can be modified, prior to their mutual reaction, with a reactive grouping which can then react, subsequent to the ionic crosslinking reaction, to form covalent crosslinkages. A typical group having such a property is the 1,2-epoxy group

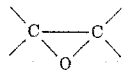

which, as is well known, can open and react with another such group or with a carboxyl group to form covalent crosslinks.

In another modification, one of the polymeric polyelectrolyte polymers contains functional groups and the other contains complementary functional groups, these complementary groups being reacted, following the ionic crosslinking reaction, to form covalent crosslinkages. The term "complementary group" has here its usual meaning in polymer chemistry (see, for example, U. S. Patents 2,333,639 and 2,333,922). It refers to functional groups reactive with one another by condensation, i. e., formation of new bonds with the elimination of elements or of simple molecules (see U. S. Patent 2,071,250).

Another method of introducing covalent crosslinkages consists in treating the ionically crosslinked polymer with a polyfunctional reagent, such as an organic diisocyanate, in which the reactive groups are complementary to groups, such as hydroxyl, in the polymer chains.

It should be noted that these methods of introducing covalent crosslinkages are well known in the polymer art. The experimental procedures employed in this last step of the process will vary according to the various methods of introducing covalent crosslinkages, but they are those which have been previously described in the literature and they are well understood by those skilled in polymer chemistry.

The final product is a polymer which is both ionically and covalently crosslinked. As already stated, these materials are insoluble in water over the entire pH range, as well as in organic solvents. Unlike the ion-crosslinked polymers they are insoluble in aqueous salt solutions such as concentrated sodium chloride solution. It is a remarkable and unexpected property of these polymers that, in spite of their inertness to solvents and water, they are characterized by a high degree of moisture permeability. Moreover, they have good wet strength and dimensional stability.

This invention is illustrated in greater detail, but not limited, by the following examples.

*Example 1*

One hundred milliliters of a 10% aqueous solution of polymethacrylic acid was titrated to a pH of 7.7 with 100 ml. of 1.0 N sodium hydroxide solution. The total volume of the resulting sodium polymethacrylate solution was 210 ml. and it contained, by titration, 0.476 milliequivalent of carboxyl group/milliliter of solution. Sufficient freshly distilled epichlorohydrin (2.2) g. to react with one-fifth of the sodium carboxylate groupings was slowly added with stirring while the mixture was cooled in an ice bath. The stirring was continued at room temperature for six hours at which time the pH had increased to 9.4. This treatment served to introduce in the polymer a number of carboglycidyloxy groups

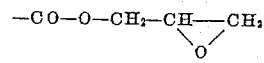

for the purpose of subsequently creating covalent crosslinkages.

Thirty milliliters of the resulting polymer solution was added with stirring to 100 ml. of an aqueous solution containing 0.1 milliequivalent/ml. of poly-beta-methacrylyloxyethyltrimethylammonium methylsulfate (the polymeric methosulfate of beta-dimethylaminoethyl methacrylate

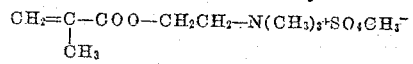

see U. S. Patent 2,138,763). The white elastic gum which separated was washed well with water to remove the sodium methylsulfate. A portion of this ionically crosslinked polymer was pressed at room temperature into a film 10 mils thick. After the film reached equilibrium with atmospheric moisture, it was repressed at 70° C. for 10 minutes. During this treatment, covalent crosslinkages formed through reaction of the epoxy groups with themselves, with carboxy groups or with quaternary ammonium groups, as evidenced by the fact that the resulting film maintained its shape when immersed for four days in either water or saturated sodium chloride solution.

In contrast, a similar film of the ion-crosslinked polyelectrolyte not containing epoxy groups, and therefore not inherently capable of undergoing covalent crosslinking, dissolved readily in a saturated sodium chloride solution and was swollen greatly when immersed in water. However, measurements showed that the moisture permeability of the ionically and covalently crosslinked film had not decreased over that of the ion-crosslinked, but not covalently crosslinked film.

In the ionically-crosslinked polymer containing epoxy groups of this example, covalent crosslinking through the epoxy groups could also be induced simply by allowing the ionically crosslinked polymer to stand at room temperature for 15–20 hours.

*Example II*

One hundred milliliters of 10% aqueous polyacrylic acid was titrated with 110 ml. of 1.0 N sodium hydroxide solution to a pH of 7.1. The total volume of the resulting sodium polyacrylate solution was 210 ml. To this was added 2.5 g. of epichlorohydrin and the mixture was stirred at room temperature for 5 hours, at which time the pH had increased to 7.4.

Immediately after preparation, 90 ml. of this glycidyl-modified sodium polyacrylate solution was added with stirring to 210 ml. of an aqueous solution (0.2 milli-equivalent/ml.) of poly - beta - methacrylyloxyethyltrimethylammonium methylsulfate. The ion-crosslinked polyelectrolyte which separated was washed well with water. A portion of this product was pressed at room temperature to form a film 10 mil thick which after air-drying was repressed at 70° C. for 10 minutes. During this operation, covalent crosslinkages formed through the 1,2-epoxy groups. The resulting film of ionically and covalently crosslinked polymer was insoluble in 20% aqueous sodium chloride. It possessed excellent permeability to water vapor, as indicated by a leather permeability value of 12,000.

In comparison, a good shoe-upper leather, such as English calf, has a leather permeability value of about 9500. In this and other examples, these data are in units of grams of water per 100 square meters per hour. They were obtained in tests carried out according to a modification of the method of Kanagy and Vickers (Journal of American Leather Chemical Association 45, 211–242, April 1950). In the modification of this test used here, an approximately 3-inch diameter crystallizing dish is filled with 12-mesh calcium chloride and covered (using tight, non-permeable seals at the edges) with a sample of the film under test, and then suspended inverted in an atmosphere of high humidity (90% relative humidity at 23° C.). The equilibrium rate of water absorption by the calcium chloride is obtained by weighing the assembly at suitable intervals, and the results are noted in the units given above. In general, under these conditions, shoe-upper leathers exhibits leather permeability values within the range 2000–18,000 gms./100 m.²/hr.

Another portion of the ionically crosslinked polymer of this example was pressed at room temperature onto a piece of nylon fabric. After air-drying, it was repressed at 70° C. for 10 minutes to form an insoluble fabric coating which exhibited good anchorage.

*Example III*

An ion-crosslinked polyelectrolyte film 10 mils in thickness was prepared as in the above examples from the reaction product of aqueous solutions of sodium polyacrylate and poly-beta-methacrylyloxyethyltrimethylammonium methylsulfate in substantially equivalent amounts. This film was suspended in a bomb containing 10 g. of ethylene oxide, and the bomb was heated to 60° C. for 4 hours.

The resulting film contained covalent crosslinkages as indicated by the insolubility of the treated film in 20% sodium chloride solution, whereas a portion of the untreated ion-crosslinked polyelectrolyte film was soluble in 20% sodium chloride solution. The covalent crosslinkages were formed by the reaction of the difunctional reagent, ethylene oxide, with the polymer chains, presumably through the carboxyl groups and quaternary ammonium groups.

*Example IV*

A polymer containing phosphoric acid groups and having the structural unit

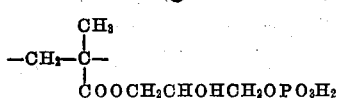

was prepared, according to the general procedure of application Ser. No. 218,885, filed by M. E. Cupery on April 2, 1951, now abandoned and of which U. S. Patent 2,723,971, dated November 15, 1955, is a continuation-in-part, as follows: A solution of 50 g. of polyglycidyl methacrylate in 500 ml. of methyl ethyl ketone was treated gradually over a period of 40 minutes with 300 ml. of 85% orthophosphoric acid. The polymeric phosphate was precipitated by pouring the solution into 3000 ml. of diethyl ether, and purified by redissolving it in isopropyl alcohol and reprecipitating it with diethyl ether.

A polymer containing quaternary ammonium acetate groups and having the structural unit

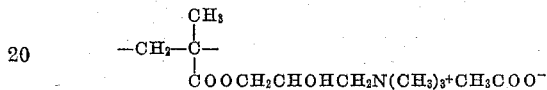

was prepared, according to the general procedure of application Ser. No. 279,937, filed by V. J. Webers on April 1, 1952, now U. S. Patent No. 2,676,166, dated April 20, 1954, as follows: To a solution of 269 g. of trimethylamine in 700 ml. of water and 250 ml. of methyl acetate (the latter yielding acetic acid on hydrolysis) was added gradually over a period of one and two-thirds hour 50 g. of finely divided polyglycidyl methacrylate at room temperature. After allowing the reaction mixture to stand overnight, the resulting solution was poured into 2800 ml. of acetone. The precipitated polyquaternary ammonium salt which precipitated was purified by redissolving it in isopropyl alcohol and reprecipitating it with diethyl ether. It was a white solid containing 4.9% nitrogen (calculated 5.36).

An ion-crosslinked polyelectrolyte was prepared by interaction of equivalent quantities of a 5% aqueous solution of the sodium salt of the above described polymeric phosphoric acid with a 5% aqueous solution of the above-described polymeric quaternary ammonium salt. The ion-crosslinked polymer which precipitated was washed thoroughly with water.

Seven grams of this polymer was milled on a rubber mill while wet and at room temperature with 0.3 g. of 2,4-toluenediisocyanate dimer (K. Ziegler, Preparative Organic Chemistry, part III, in FIAT Review of German Science 1939–1946) as the crosslinking agent. The resulting product was pressed immediately at room temperature to form a film 10 mils in thickness. After air-drying, the film was heated to 70° C. for 15 minutes, whereupon it became insoluble in saturated sodium chloride solution as well as in organic solvents. This was the result of the covalent crosslinkages introduced by reaction of the toluene-2,4-diisocyanate dimer with the hydroxyl groups present in each polymer chain.

*Example V*

A solution of 2 g. of poly-p-aminostyrene in 2 ml. of glacial acetic acid was diluted with sufficient water to give a total volume of 20 ml. Ten milliliters of this solution (8.4 milliequivalents) was mixed with 20 ml. of the aqueous solution of epichlorohydrin-modified sodium polymethacrylate described in Example I. The precipitate of ionically crosslinked polymer which formed was washed well with water and was pressed into various structures such as films or pellets.

After air-drying for three days at room temperature, this product was insoluble in saturated solutions of sodium chloride and sodium acetate. This indicated the formation of covalent crosslinkages through the epoxy groups since an ion-crosslinked polymer prepared similarly from poly-p-aminostyrene acetate and unmodified sodium polymethacrylate was soluble in saturated sodium chloride solution.

The ionically and covalently crosslinked polymers of this invention can also be shaped into filamentary structures, as illustrated in the following example:

Example VI

An aqueous solution of glycidyl-modified sodium polyacrylate was prepared according to the procedure of Example II. A portion of this solution was ejected from a hypodermic syringe through a number 25 hypodermic needle under the surface of an aqueous solution containing 2.5% of poly-4-vinyl-n-butylpyridinium bromide and 5% of poly-beta-methacrylyloxyethyldiethylmethylammonium methyl sulfate. The coagulum which formed at the tip of the needle was pulled away as thin filaments. After air-drying for about 20 hours, these filaments were insoluble in aqueous sodium chloride solution, showing the presence of covalent crosslinkages.

The starting materials suitable for the preparation of the polymers of this invention include broadly any polyanionic and polycationic linear polymer, said polymer containing a plurality, at least seven, of ionic groups attached to the linear polymer chain. In general, these polymers have a molecular weight in excess of about 1000, in order to contain sufficient ionic groups for good crosslinking. They should be soluble to at least some extent, e. g., about 5%, in the reaction medium, which can be an organic polar solvent (e. g., alcohols tetrahydrofuran, dimethylformamide, chlorohydrocarbons, ethyl acetate, acetone and the like) but is preferably water. Both addition polymers (e. g., vinylidene polymers) and condensation polymers can be used, the former being generally more accessible and therefore preferred.

Among the suitable polyanionic polymers can be mentioned the polymers of polymerizable aliphatic monocarboxylic acids having a methylene ($CH_2=$) group attached by an ethylenic double bond to a carbon atom alpha to the carboxylic acid group, e. g., polyacrylic acid, polymethacrylic acid, polyethacrylic acid, poly-alpha-chloroacrylic acid, etc.; the interpolymers of monocarboxylic acids of the acrylic series with polymerizable vinylidene compounds, for example, the copolymers of methacrylic acid with methyl methacrylate, vinyl acetate, styrene or 1,3-butadiene, or the copolymers of acrylic acid with acrylonitrile; the hydrolyzed copolymers of alpha, beta-ethylenically unsaturated dicarboxylic acid anhydrides such as maleic anhydride with polymerizable vinylidene compounds such as ethylene, propylene, isobutylene, styrene, methylvinyl ether, vinyl acetate, vinyl chloride, methyl acrylate, etc.; the polymeric acids obtained by reacting phosphoric acid with polymers containing epoxy groups (application Ser. No. 218,885, filed by M. E. Cupery on April 2, 1951, now abandoned, of which Patents 2,692,876, issued October 26, 1954, and 2,723,971, issued November 15, 1955, are continuations-in-part); the naturally occurring polymers, or derivatives thereof, containing a plurality of acidic groups, such as lignic acid, alginic acid, carboxymethylcellulose; and the like.

In order to facilitate the subsequent formation of covalent crosslinks, the polyanionic polymers are desirably copolymers containing functional groups capable of covalent crosslinking by themselves or by reaction with a complementary functional group. Such functional groups include, for example, the 1,2-epoxy, hydroxy and mercapto. However, the presence of such functional groups, although desirable, is not essential since covalent crosslinkages can be introduced through reaction with some polyfunctional reagents, such as ethylene oxide.

It is understood that the polyanionic polymers can be, and often desirably are, neutralized with a base such as ammonia, sodium hydroxide or potassium hydroxide prior to reacting with the polycationic polyelectrolyte, in order to increase their solubility in water. Thus, the polyanionic polymers are linear acidic organic polymers containing attached to carbon atoms thereof a plurality of carboxyl (—COOH) or —$OPO_3H_2$ groups and salts of these linear acidic organic polymers. A preferred class of these polyanionic polymers are the salts of linear acidic organic polymers containing attached to carbon atoms thereof a plurality of carboxyl groups and also a plurality of 1,2-epoxy groups.

The polycationic polyelectrolytes include any linear polymer or copolymer containing a plurality of primary, secondary or tertiary amino groups attached to the linear polymer chain. Additional examples of suitable polycationic polymers are polyvinylamine; the hydrogenated 1,3-butadiene/acrylonitrile and 1,3-butadiene/methacrylonitrile copolymers; the polyamines obtained by reductive amination of ethylene/carbon monoxide copolymers (U. S. Patent 2,495,255); polyethylenimine, poly-N-methylethylenimine; the polyvinylpyridines, the polyvinylquinolines; the polymerized acrylates and methacrylates of N-beta-hydroxyethyl tertiary amines such as beta-dimethylaminoethyl acrylate, beta-di-n-butylaminoethyl methacrylate, triethanolamine monomethacrylate, beta-dicyclohexylaminoethyl methacrylate, 1-(beta-methacrylyloxyethyl)piperidine, 4-(beta-methacrylyloxyethyl)-morpholine; the linear polyamides containing intralinear tertiary amino groups (U. S. Patent 2,274,831); the aminated products obtained by catalytically hydrogenating resins having ketone groups in the presence of ammonia or amines (U. S. Patent 2,063,158); the reaction products of vinyl ketone polymers with ammonia or primary amines (U. S. Patent 2,122,707); the linear polyamines resulting from the condensation of diamines with evolution of ammonia; the polymeric amines resulting from the reaction of ammonia, primary or secondary amines with polymers containing epoxy groups (application Ser. No. 295,127, filed on June 23, 1952, by M. E. Cupery, now Patent No. 2,781,335, issued February 12, 1957); the polymeric quaternary ammonium salts obtained by reacting polymers containing epoxy groups with a tertiary amine and water or an acid (application Ser. No. 279,937, filed on April 1, 1952, by V. J. Webers, now U. S. Patent No. 2,676,166, dated April 20, 1954), and the like.

The polycationic polymers, like the polyanionic polymers, can be copolymers containing neutral functional groups capable of covalent crosslinking, for example, hydroxy groups.

It is to be understood that the polycationic polymers can be, and preferably are, used in more water-soluble forms, e. g., as their salts with organic or inorganic acids, such as the acetate, hydrochloride or sulfate, or, in the case of polymers containing tertiary amino groups, as their quaternary ammonium salts, for example, with alkyl halides or dialkyl sulfates. Thus, the polycationic polymers are linear organic polymers containing attached to carbon atoms thereof a plurality of amino groups or a plurality of quaternized amino groups and salts of these linear organic polymers containing amino groups.

The preferred polycations, from the standpoint of the properties of the final polymers, are the already mentioned polymerized acrylates and methacrylates of N-beta-hydroxyethyltertiary amines and quaternary ammonium salts thereof, particularly polymers of a quaternized methacrylic acid ester of an N-beta-hydroxyethyl tertiary amine. The term "polmer of a quaternized methacrylic acid ester of an N-beta-hydroxyethyl tertiary amine" includes polymers of methacrylic acid esters of an N-beta-hydroxyethyl tertiary amine which are quaternized after polymerization as well as those wherein the methacrylic acid esters of an N-beta-hydroxyethyl tertiary amine are quaternized before polymerization. Such compounds are described, for example, in U. S. Patent 2,138,763.

As already stated, covalent crosslinks can be introduced in the ionically crosslinked polymer by any suitable known method. When one or both of the polyelectrolytes has a "built-in" crosslinking functionality, e. g., 1,2-epoxy or mercapto groups, no additional crosslinking agent is necessary. Simple heating of the ionically crosslinked polymer at temperatures within the range of 50–100° C. will cause crosslinking, or even standing at room temperature for a period of time will be sufficient in some cases. When neither polyelectrolyte has a crosslinkable functional group, it is necessary to react the ionically crosslinked polymer with a polyfunctional reagent which establishes atomic bridges across the polymer chains. Many such polyfunctional reagents have been used in polymer chemistry, including, for example, ethylene oxide and propylene oxide.

Regardless of how the crosslinking reaction is carried out, its effect can generally be detected by the fact that the ionically crosslinked polymer becomes completely insoluble in a saturated aqueous sodium chloride solution. In view of the effectiveness of polyfunctional reagents in introducing covalent crosslinkages, another preferred embodiment of the invention is that in which the ionically crosslinked polymer is reacted with a bifunctional reagent (e. g., organic diisocyanates, diisothiocyanates), in which the reactive groups are complementary to functional groups (e. g., hydroxyl groups) in the polymer chains.

In some instances, additional desirable properties are imparted to the ionically and covalently crosslinked polymers of this invention by an aftertreatment with salts of polyvalent cations or of polyvalent anions, such as barium chloride, calcium chloride, magnesium chloride, tin tetrachloride, aluminum chloride, cadmium acetate, lead nitrate, mercuric chloride, zinc chloride, nickel diacetate, aluminum potassium sulfate, basic chromium sulfate, sodium silicate, sodium cobaltinitrite, sodium chloroplatinate, and the like. Such a treatment reduces the tack of the wet compositions, gives stiffer products and serves to vary the texture of the films, e. g., to give them a rougher feel.

In a useful embodiment of the invention, the ionically and covalently crosslinked copolymer is employed as a blend with a water-dispersible, synthetic polymeric nonelectrolyte. This treatment is preferably carried out by mixing one of the polyelectrolytes with an aqueous dispersion of the nonelectrolyte polymer, and adding the other polyelectrolyte to this mixture. The formation of the ion-crosslinked, water-insoluble polymer is attended by coagulation of the aqueous dispersion of the nonelectrolyte polymer. The product which separates is a blend of the ion-crosslinked polymer with the nonelectrolyte polymer. The polymer blend is then covalently crosslinked as described.

Blends of this type have superior film strength and good pliability at low humidity. These blends can be prepared using any water-insoluble, but water-dispersible, nonelectrolyte polymer. These are preferably the polymerization or copolymerization products of such vinylidene monomers as ethylene, 1,3-butadiene, 2-chloro-1,3-butadiene, styrene, vinyl acetate, vinyl chloride, vinyl fluoride, vinylidene chloride, acrylonitrile, methacrylonitrile, tetrafluoroethylene, or the water-dispersible condensation polymers of the polyamide and polyester types. The nonelectrolyte polymer may contain functional groups capable of reacting with the covalent crosslinking agent.

The ionically and covalently crosslinked polymers of this invention are particularly useful in the form of self-supporting film suitable for packaging, and of supported film in the coating of porous materials such as textile fabrics. Their stability and high degree of moisture permeability make them highly useful as hydrophilic fibers, substitutes for leather, and in many other fields.

An important application of these polymers is their use as antistatic coatings. For this purpose, the polymers are desirably prepared directly on the fabric to be coated. For example, the fabric is impregnated with an aqueous solution of sodium polyacrylate containing epoxy groups, then passed through an aqueous solution of a polymeric polyquaternary ammonium salt, whereby the ion-crosslinked polymer forms directly on the fabric. The fabric is then heat-treated to introduce the covalent linkages. The resulting material has good antistatic properties, which are retained even after repeated washings with soap or with synthetic detergents.

The polymers of this invention are also useful in the surface coating and impregnating of non-woven webs of natural and synthetic fibers. They can also be shaped in the form of monofils or of fine fibers, which can be used to make fabrics or non-woven webs.

As many apparently widely different embodiments of this invention may be made without departing from the spirit and scope thereof, it is to be understood that this invention is not limited to the specific embodiments thereof except as defined in the appended claims.

I claim:

1. A reaction product of (A) a linear polymer from the class consisting of (a) linear acidic organic polymers containing attached to carbon atoms thereof a plurality of groups from the class consisting of —COOH and —OPO$_3$H$_2$ groups, and (b) salts of said linear acidic organic polymers, with (B) a linear polymer from the class consisting of (a) linear organic polymers containing attached to carbon atoms thereof a plurality of groups from the class consisting of amino groups and quaternized amino groups and (b) salts of said linear organic polymers containing amino groups, said polymers being united in said reaction product through ionic crosslinkages, and being further united through covalent crosslinkages formed by reaction of said polymers with a member from the class consisting of organic diisocyanates and 1,2-epoxy compounds.

2. A textile fabric coated with the reaction product of claim 1.

3. A non-woven fiber web coated with the reaction product of claim 1.

4. A woven fabric coated with the reaction product of claim 1.

5. A reaction product of (A) a salt of a linear acidic organic polymer containing attached to carbon atoms thereof a plurality of carboxyl groups with (B) a linear organic polymer containing attached to carbon atoms thereof a plurality of quaternized amino groups, said polymers being united in said reaction product through ionic crosslinkages, and being further united through covalent crosslinkages formed by reaction of said polymers with a 1,2-epoxy compound.

6. A reaction product as set forth in claim 5 wherein said linear organic polymer (B) is a polymer of a quaternized methacrylic acid ester of an N-beta-hydroxyethyl tertiary amine.

7. A reaction product as set forth in claim 5 wherein said salt of a linear acidic organic polymer (A) is a water-soluble salt of a polymer of an alpha-methylene aliphatic monocarboxylic acid.

8. A reaction product as set forth in claim 5 wherein said salt of a linear acidic organic polymer (A) is sodium polymethacrylate and said linear organic polymer (B) is a polymer of a quaternized methacrylic acid ester of an N-beta-hydroxyethyl tertiary amine.

9. A reaction product as set forth in claim 5 wherein said salt of a linear acidic organic polymer (A) is sodium polyacrylate and said linear organic polymer (B) is a polymer of a quaternized methacrylic acid ester of an N-beta-hydroxyethyl tertiary amine.

10. A reaction product of (A) a salt of a linear acidic organic polymer containing attached to carbon atoms thereof a plurality of carboxyl groups and a plurality of 1,2-epoxy groups, with (B) a linear organic polymer containing attached to carbon atoms thereof a plurality of quaternized amino groups, said polymers being united in said reaction product through ionic crosslinkages, and being further united through covalent crosslinkages formed by reaction of said polymers with said 1,2-epoxy groups.

11. A reaction product as set forth in claim 10 wherein said salt of a linear acidic organic polymer (A) is the partial reaction product of a water-soluble salt of a polymer of an alpha-methylene aliphatic monocarboxylic acid with epichlorohydrin.

12. A reaction product as set forth in claim 10 wherein said salt of a linear acidic organic polymer (A) is the partial reaction product of sodium polymethacrylate with epichlorohydrin and said linear organic polymer (B) is a polymer of a quaternized methacrylic acid ester of an N-beta-hydroxyethyl tertiary amine.

13. A reaction product as set forth in claim 10 wherein said salt of a linear acidic organic polymer (A) is the partial reaction product of sodium polyacrylate with epichlorohydrin and said linear organic polymer (B) is a polymer of a quaternized methacrylic acid ester of an N-beta-hydroxyethyl tertiary amine.

14. A reaction product of (A) a salt of a linear acidic organic polymer containing attached to carbon atoms thereof a plurality of —OPO$_3$H$_2$ groups and a plurality of hydroxyl groups with (B) a linear organic polymer containing attached to carbon atoms thereof a plurality of quaternized amino groups and a plurality of hydroxyl groups, said polymers being united in said reaction product through ionic crosslinkages, and being further united through covalent crosslinkages formed by reaction of said polymers with an organic diisocyanate.

15. A reaction product as set forth in claim 14 wherein said salt of a linear acidic organic polymer (A) is a water-soluble salt of the reaction product of a polymer of a 1,2-epoxy vinylidene monomer with phosphoric acid.

16. Process for preparing a moisture permeable, water-insoluble product which comprises reacting in aqueous solution (A) a salt of a linear acidic organic polymer containing attached to carbon atoms thereof a plurality of carboxyl groups and a plurality of 1,2-epoxy groups with (B) a linear organic polymer containing attached to carbon atoms thereof a plurality of quaternized amino groups, thereby uniting said polymers through ionic crosslinkages, and heating the resulting ionically crosslinked polymers thereby further uniting said polymers through covalent crosslinkages formed by reaction of said polymers with said 1,2-epoxy groups.

17. Process for preparing a moisture permeable, water-insoluble product as set forth in claim 16 wherein said salt of a linear acidic organic polymer (A) is the partial reaction product of a water-soluble salt of a polymer of an alpha-methylene aliphatic monocarboxylic acid with epichlorohydrin.

18. Process for preparing a moisture permeable, water-insoluble product as set forth in claim 16 wherein said salt of a linear acidic organic polymer (A) is the partial reaction product of sodium polymethacrylate with epichlorohydrin and said linear organic polymer (B) is a polymer of a quaternized methacrylic acid ester of an N-beta-hydroxyethyl tertiary amine.

19. Process for preparing a moisture permeable, water-insoluble product as set forth in claim 16 wherein said salt of a linear acidic organic polymer (A) is the partial reaction product of sodium polyacrylate with epichlorohydrin and said linear organic polymer (B) is a polymer of a quaternized methacrylic acid ester of an N-beta-hydroxyethyl tertiary amine.

References Cited in the file of this patent

UNITED STATES PATENTS

| | | |
|---|---|---|
| 2,319,791 | Coes | May 25, 1943 |
| 2,503,209 | Nyquist et al. | Apr. 4, 1950 |
| 2,527,863 | Webb | Oct. 31, 1950 |
| 2,563,898 | Wilson et al. | Aug. 14, 1951 |
| 2,578,937 | Kunin et al. | Dec. 18, 1951 |
| 2,582,194 | Dudley | Jan. 8, 1952 |
| 2,607,750 | Wilson et al. | Aug. 19, 1952 |
| 2,625,529 | Hedrick et al. | Jan. 13, 1953 |

FOREIGN PATENTS

| | | |
|---|---|---|
| 586,759 | Great Britain | Mar. 31, 1947 |

OTHER REFERENCES

Fuoss et al.: Article in Science 110, pages 552–4, November 25, 1949.